United States Patent [19]

Dieterich et al.

[11] Patent Number: 5,173,730
[45] Date of Patent: Dec. 22, 1992

[54] THRUST-TYPE FILM CASSETTE ASSEMBLY

[75] Inventors: David A. Dieterich, Rochester; David B. Kemp, Fairport; Christopher T. Mattson, Rochester, all of N.Y.

[73] Assignee: Eastman Kodak Company, Rochester, N.Y.

[21] Appl. No.: 696,478

[22] Filed: May 6, 1991

[51] Int. Cl.⁵ ............................................. G03B 17/26
[52] U.S. Cl. ..................................... 354/275; 242/71.1
[58] Field of Search ................ 354/275; 242/71.1, 71.9

[56] References Cited

U.S. PATENT DOCUMENTS

| | | | |
|---|---|---|---|
| 4,834,306 | 6/1989 | Robertson et al. | 354/275 |
| 4,848,693 | 7/1989 | Robertson | 354/275 |
| 4,866,469 | 9/1989 | Shiba et al. | 354/212 |
| 4,883,235 | 11/1989 | Niedospial, Jr. | 354/275 |
| 4,948,063 | 8/1990 | Niedospial, Jr. | 354/275 |

Primary Examiner—Michael L. Gellner
Assistant Examiner—David M. Gray
Attorney, Agent, or Firm—William T. French; Roger A. Fields; Joshua G. Levitt

[57] ABSTRACT

A new film cassette assembly comprises a thrust type cassette and a roll of a photographic film having particular properties. One such property is a low coefficient of friction between the emulsion side and back side of the film. In preferred embodiments the film has a stiffness sufficient to avoid buckling of the film when the film spool is rotated in the unwinding direction and is very thin. Most preferably, it is formed from a hydrophilic copolyester having the desired stiffness.

8 Claims, 10 Drawing Sheets

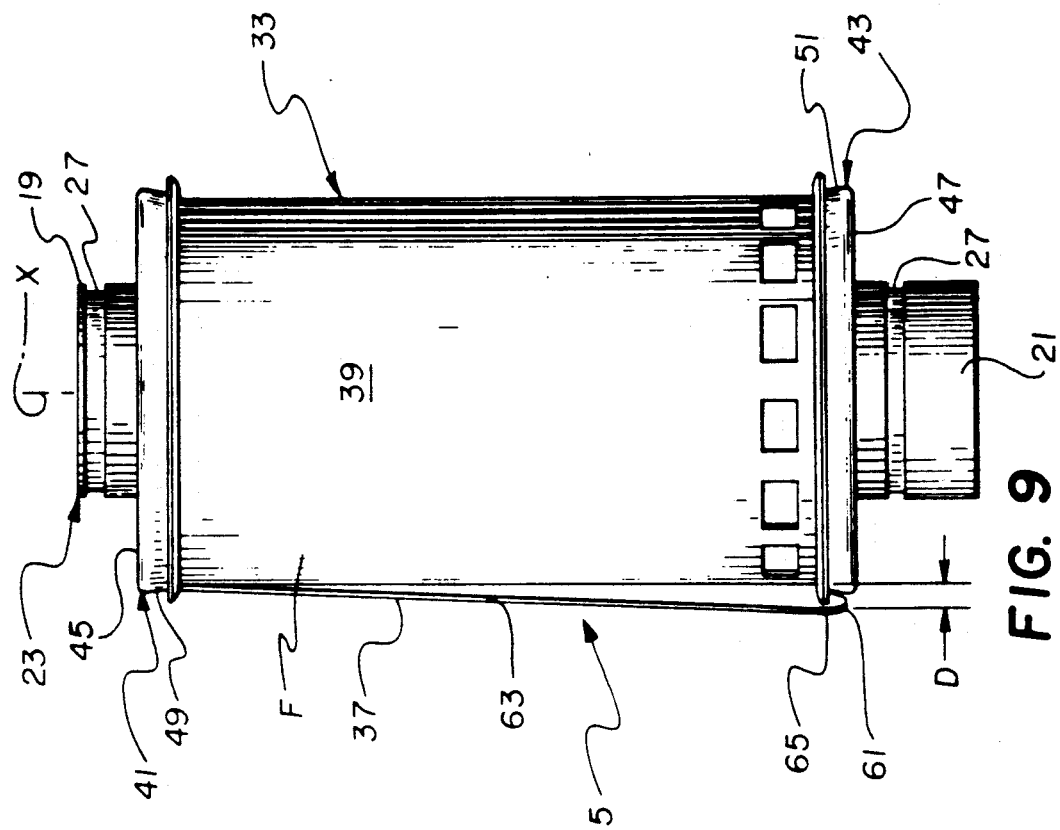
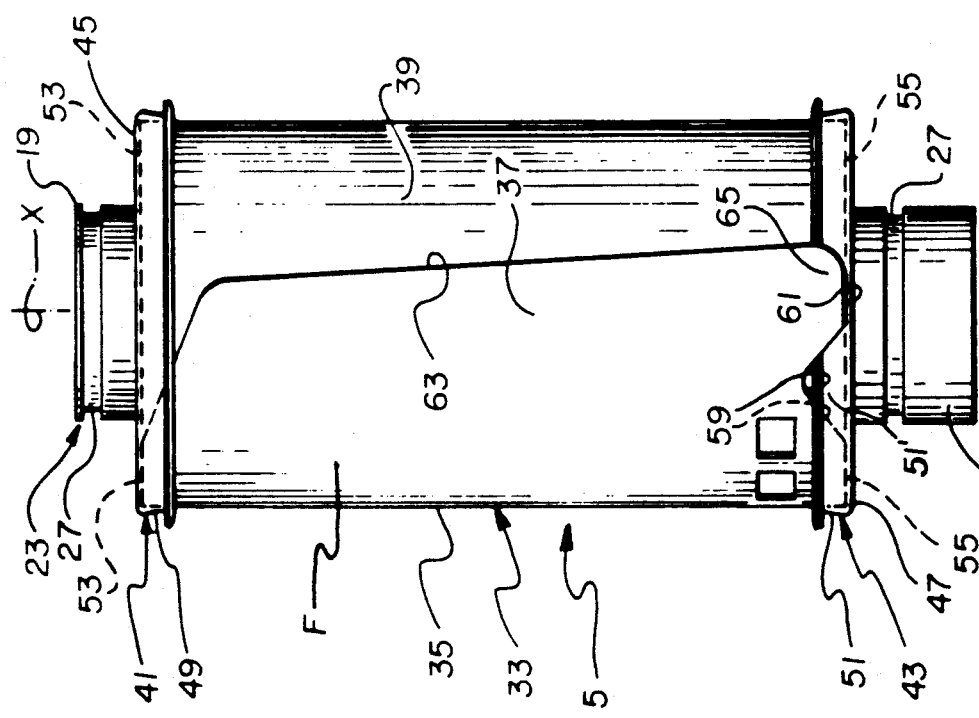

THRUST-TYPE FILM CASSETTE ASSEMBLY

CROSS-REFERENCE TO RELATED APPLICATIONS

Reference is made to commonly assigned copending application Ser. No. 506,320, filed Apr. 9, 1990.

FIELD OF THE INVENTION

This invention relates to a novel photographic article and, more particularly, to an assembly comprising the combination of a thrust-type photographic film cassette with a film which is particularly adapted for improving the functioning of such a cassette.

BACKGROUND OF THE INVENTION

In conventional 35mm film cassettes the filmstrip is wound on a flanged spool which is rotatably supported within a cylindrical shell. A leading or forward-most section of the filmstrip approximately 6 cm long, commonly referred to as a "film leader", protrudes from a light-trapped slit or mouth of the cassette shell. One end of the spool has a short axial extension which projects from the shell, enabling the spool to be turned by hand. If the spool is initially rotated in an unwinding direction, the film roll inside the shell will tend to expand radially since the inner end of the filmstrip is attached to the spool, and the leader section protruding from the slit will remain stationary. The film roll can expand radially until a firm non-slipping relation is established between its outermost convolution and the inner curved wall of the shell. Once this non-slipping relation exists, there is a binding effect between the film roll and the shell which prevents further rotation of the spool in the unwinding direction. Thus, rotation of the spool in the unwinding direction cannot serve to advance the filmstrip out of the shell, and it is necessary in the typical 35 mm camera to engage the protruding leader section to draw the filmstrip out of the shell.

A 35 mm film cassette has been proposed in U.S. Pat. No. 4,423,943 which, unlike conventional film cassettes, can be operated to thrust a film leader out of the cassette shell by rotating the film spool in the unwinding direction. The film leader originally is located entirely inside the cassette shell. A characteristic of this type of cassette is that the film strip becomes transversely bowed as it is uncoiled from the film spool. This facilitates movement of the film to a passageway leading to the outside of the cassette shell. A drawback of this kind of cassette is that severe transverse bowing of the filmstrip may damage the filmstrip.

Commonly assigned U.S. Pats. Nos. 4,834,306; 4,848,693; 4,883,235 and 4,948,063 each disclose a film cassette which requires no transverse bowing of the filmstrip, but which is capable of automatically advancing a non-protruding film leader to the outside of the film cassette shell in response to rotation of the film spool in the unwinding direction.

It has been found that, when the film leader is thrust through the light-tight passageway to the exterior of the cassette shell, the passageway presents some resistance to outward movement of the leader. This resistance may cause the leader to uncoil against the interior curved wall of the cassette shell. Consequently, increased torque will be required to rotate the film spool in the unwinding direction. This is a disadvantage.

The application of Niedospial, Ser. No. 506,320, filed Apr. 9, 1990, discloses a further improved film cassette wherein a pair of flexible flanges are coaxially arranged along the film spool to confine the ends of film roll coiled about the spool within respective skirted peripheries of the flanges. This prevents the film leader from uncoiling against an interior curved wall of the cassette shell. A film stripper proximate to a light-tight passageway to the exterior of the cassette shell is received between the film leader and the next-inward convolution of the film roll responsive to rotation of the spool core in the unwinding direction to remove the leader from the confinement of the skirted peripheries to permit it to enter the passageway. At least one of the flexible flanges is fixed to the spool core in the unwinding direction to effect a frictional relationship between the film leader and the skirted periphery of the flange, thereby improving the ability of the film spool to thrust the film leader through the light-tight passageway to the exterior of the cassette shell.

All film cassettes such as disclosed in the cited references, wherein a non-protruding film leader is pushed, propelled or thrust (instead of being pulled) to the exterior of the cassette shell are referred to herein as thrust-type film cassettes. These cassettes are in general, useful with conventional photographic roll films such as cellulose triacetate films of 35 mm size and conventional thickness. Conventional photographic roll film has a relatively high coefficient of friction between its emulsion side and back side. This has been advantageous in the manufacture of the film because the film is not so slippery as to cause large rolls of it to telescope or unwind during handling of the rolls.

U S. Pat. No. 4,866,469 relates to a preloaded single-use camera in which the unexposed film is pulled or drawn from a first holding chamber to a second holding chamber. Although the patentees discuss "coefficient of dynamic friction" between the front and back layers of a film as measured by a particular test, the patentees are not concerned with film cassettes. In particular, they have no suggestions with regard to film cassettes from which a photographic film is thrust rather than pulled from a supply chamber. The patent has no suggestion of the problems encountered in the functioning of a thrust cassette.

BRIEF SUMMARY OF THE INVENTION

In accordance with the present invention it has been discovered that the thrusting of film from a thrust-type cassette can be improved by providing a low coefficient of friction between the emulsion and back sides of the film. Furthermore, with a film having such slippery surfaces, the thrust cassette can function well with a very thin film which otherwise would be difficult to thrust. These discoveries are based on a recognition of the unique combination of forces acting on the film in a thrust cassette. This combination of forces is not present in the pull-type of film advance in conventional cameras nor in the article of U.S. Pat. No. 4,866,469.

The new film cassette assembly of the present invention comprises a thrust-type film cassette and a roll of photographic film wherein
(a) the cassette includes a film thrusting means and a cassette shell; (b) the thrusting means includes a spool core supported for rotation in an unwinding direction within the cassette shell; (c) a film roll, the outermost convolution of which is a film leader, is coiled about said spool core; and (d) upon rotation of the spool core in an unwinding direction, said film thrusting means thrusts the film leader through a light-tight passageway to the exterior of said cassette shell, and further, wherein said film is characterized in that said film has a photographic emulsion side and a back side and at least one of said emulsion side and said back side includes integral means for providing a coefficient of friction between the emulsion side and the back side that is less than about 0.25, which is sufficiently low that, when the spool core is rotated in an unwinding direction, an unwinding or radial force is transmitted along all of the convolutions of the film roll from the innermost convolution to the outermost convolution to assist the thrusting means in thrusting the film through the light-tight passageway.

BRIEF DESCRIPTION OF THE DRAWINGS

FIGS. 8 and 9 are elevation views of the film roll and the film spool of said preferred embodiment, illustrating the manner in which the film roll is originally stored on the film spool;

DETAILED DESCRIPTION

Figure 1:
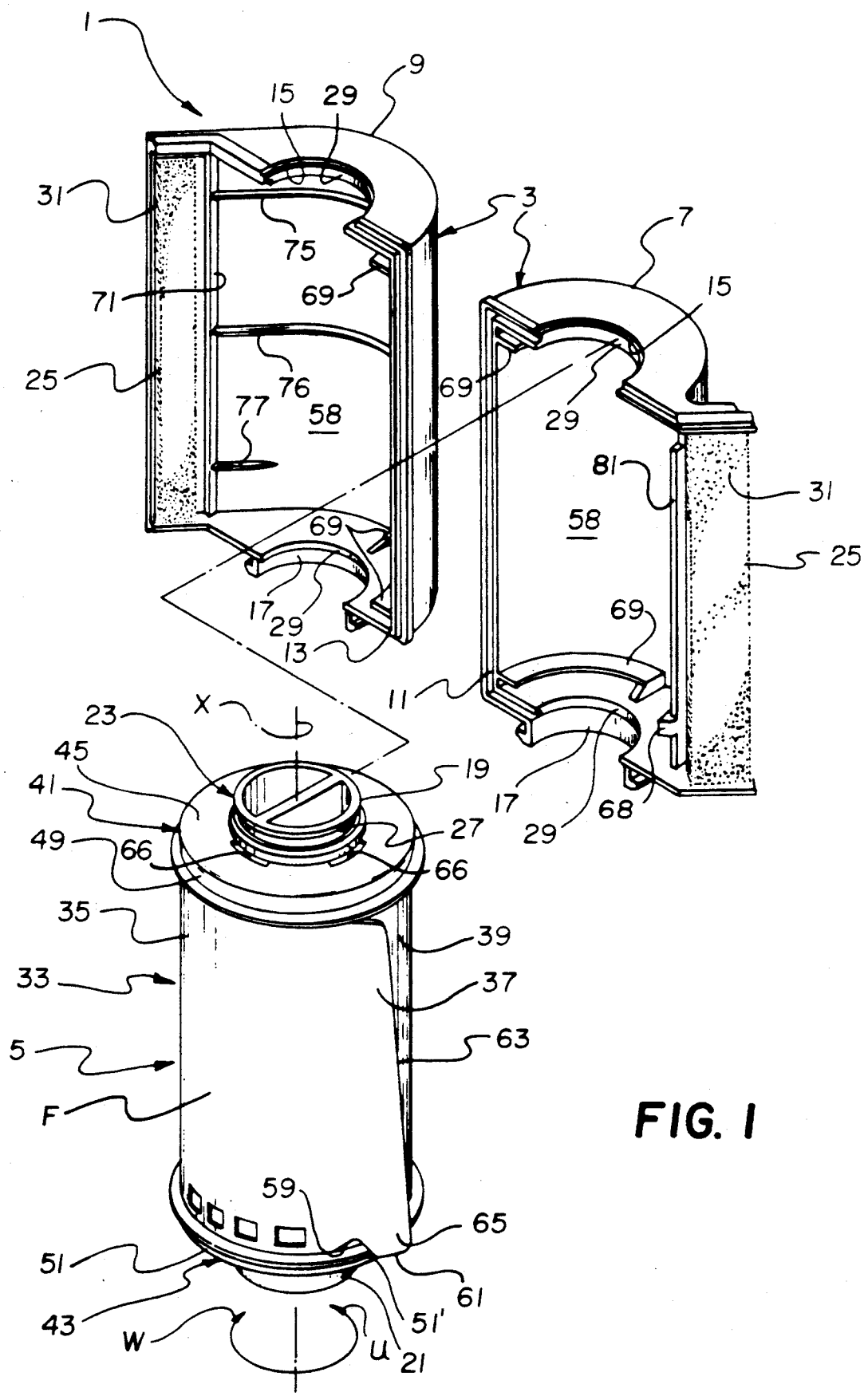
FIG. 1 is an exploded perspective view of a film cassette assembly according to a preferred embodiment of the invention.

The structure of the thrust cassette in the cassette assembly of the invention can be any such structure having a film thrusting means which is assisted in its film thrusting function by the transmission of unwinding forces through the series of film convolutions on a spool core. The invention can best be illustrated, however, by reference to a preferred cassette structure as shown in the drawings.

Figure 2:
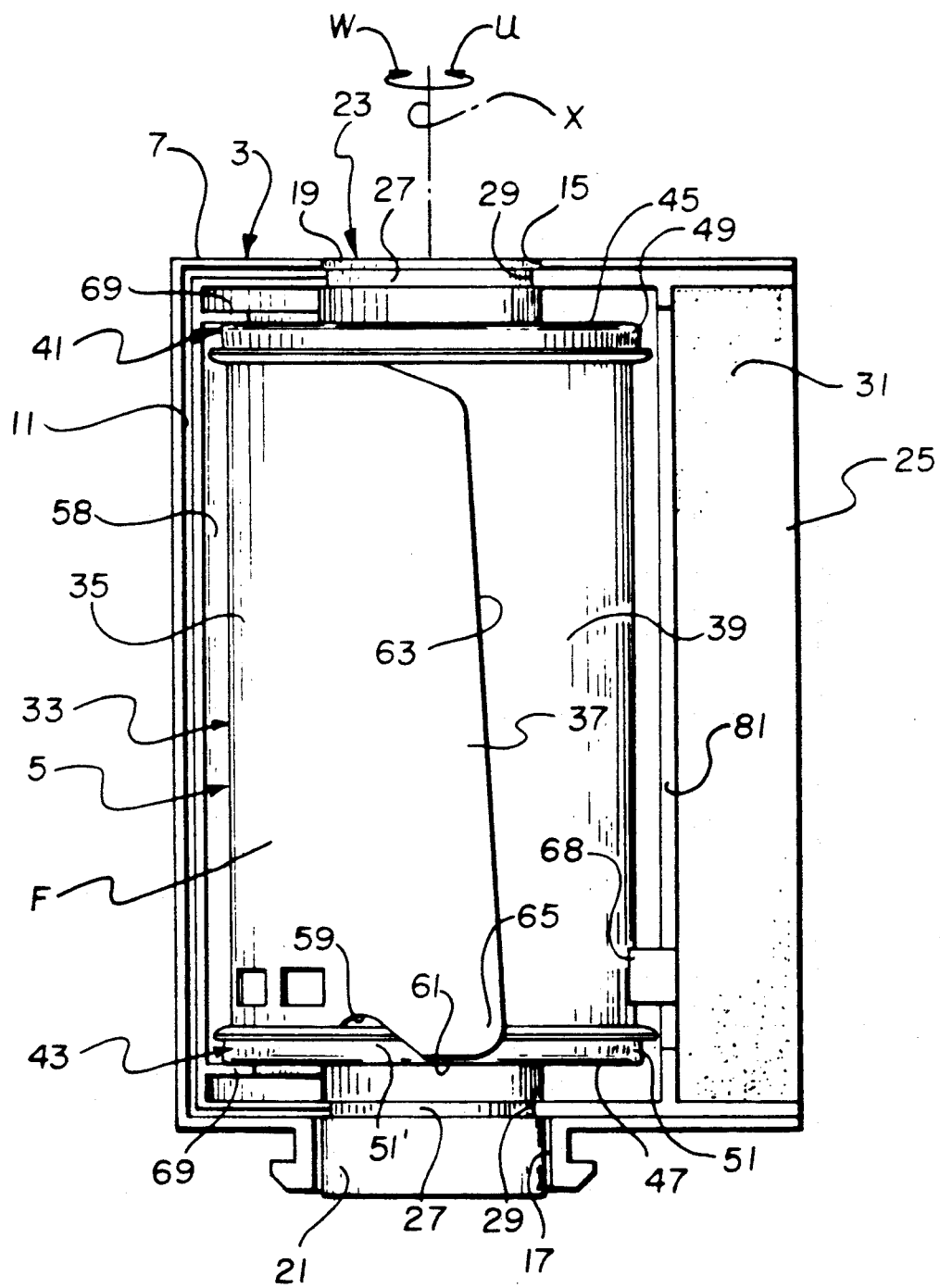
FIG. 2 is an elevation view of the film cassette assembly of said preferred embodiment, illustrating the cassette shell open to reveal a film roll coiled about a film spool.
Figure 3:
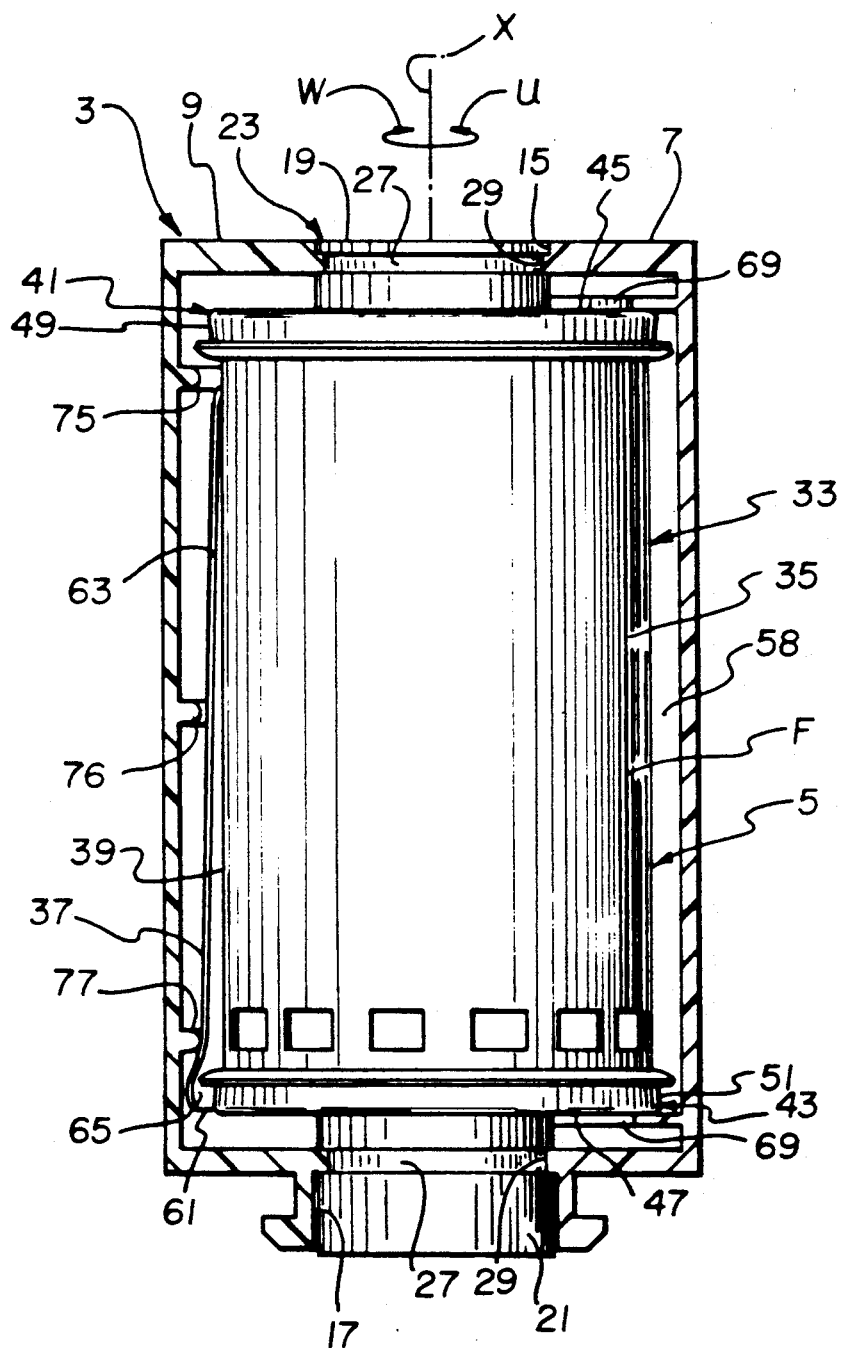
FIG. 3 is an elevation view similar to FIG. 2, though in section.

Referring to the drawings, FIGS. 1, 2 and 3 depict an improved 35 mm film cassette assembly 1 comprising a light-tight cassette shell 3 and a film roll 5 which is rotatable about an axis X in a film unwinding and winding directions U and W within the cassette shell. The cassette shell 3 consists of two shell halves 7 and 9 which are mated along respective grooved and stepped edge portions 11 and 13. The mated halves 7 and 9 define upper and lower aligned circular openings 15 and 17 for relatively shorter and longer opposite open-end pieces 19 and 21 of a spool core or hub 23, and they define a narrow relatively-straight film passageway 25 to the exterior of the cassette shell 3. The longer and shorter open-end pieces 19 and 21 of the spool core 23 each include an annular peripheral groove 27 which mates with a corresponding edge portion 29 of the respective openings 15 and 17 in the cassette shell 3 to rotatably support the film spool 5 for rotation about the axis X in the film unwinding and winding directions U and W. A known black velvet or plush material 31 lines the interior of the film passageway 25 to prevent ambient light from entering the film passageway.

Figure 13:
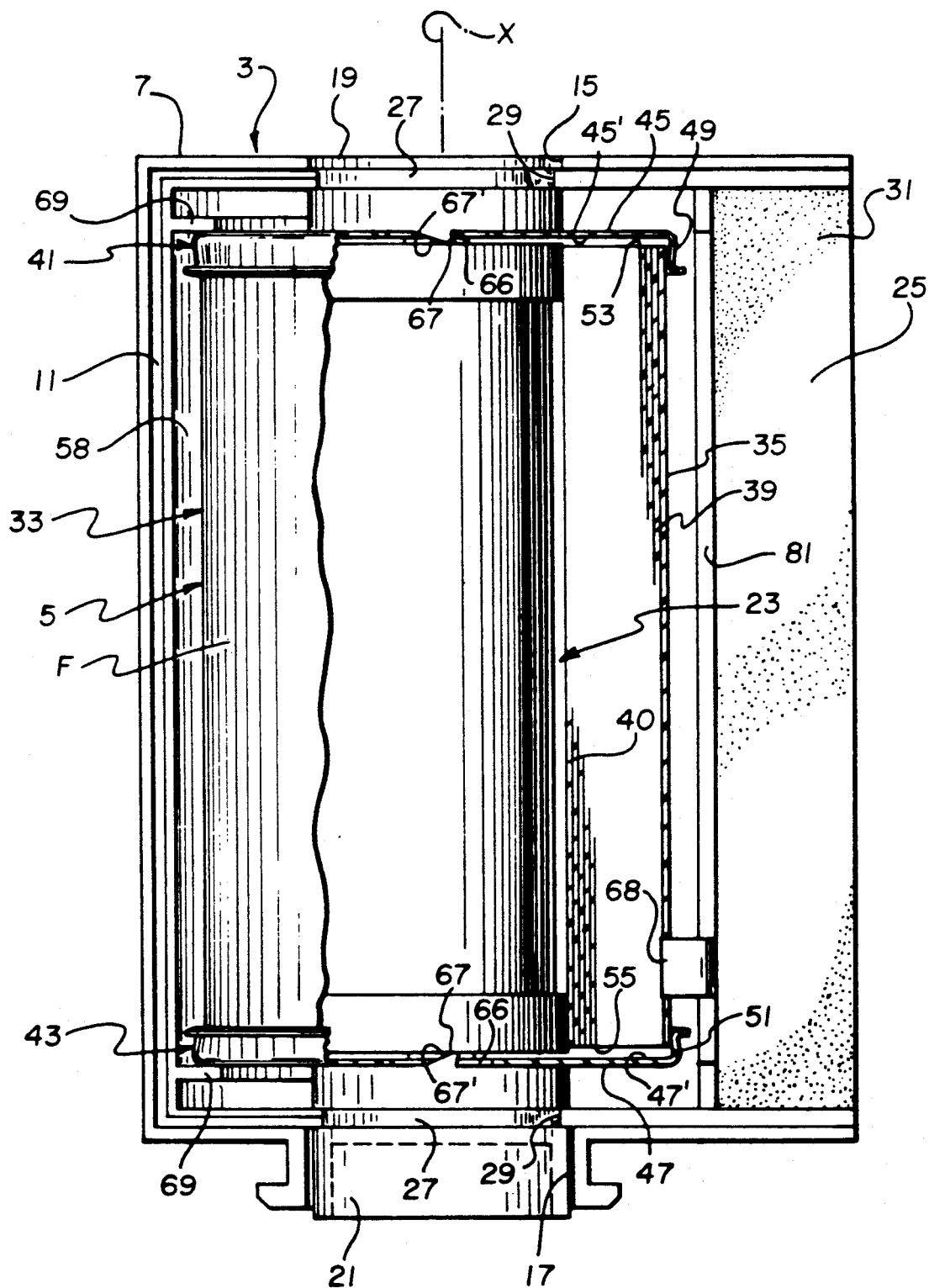
FIG. 13 is an elevation view partly in section of the film roll and the film spool of said preferred embodiment, illustrating the manner in which one of a pair of film confining flanges of the spool may be fixed to the spool for concurrent rotation with the spool.

A roll 33 of 35 mm filmstrip F is coiled about the spool core 23 to form successive film convolutions. As shown in FIG. 3, the film roll 33 includes an outermost convolution which comprises a film leader 35 having a leading or forward end 37, and it includes a next-inward convolution 39 coiled behind the outermost convolution. The inner or trailing end of an innermost convolution 40 of the film roll 33 is secured to the spool core 23 using known attachment means, not shown. See FIG. 13.

A pair of upper and lower identical, very thin, flexible film constraining flanges 41 and 43 are coaxially spaced along the spool core 23 as shown in FIGS. 1, 2, 8, 12 and 13. The two flanges 41 and 43 comprise respective integral disks 45 and 47 and respective integral annular lips or skirts 49 and 51 which circumferentially extend from the disks. The two disks 45 and 47 cover opposite substantially flat sides of the film roll 33 which are defined by corresponding opposite longitudinal edges 53 and 55 of each successive convolution of the film roll, and they have respective central holes 56 through which the spool core 23 coaxially extends to permit rotation of the spool core relative to the flanges 41 and 43. See FIG. 12. Respective circumferential recesses 57 are provided in the spool core 23 for supporting the flanges 41 and 43 at their disks 45 and 47 to permit the flanges to be independently rotated about the axis X. The two recesses 57 are sufficiently spaced from one another along the spool core 23 to maintain respective inner faces 45' and 47' of the disks 45 and 47 slightly spaced from the longitudinal edges 53 and 55 of each successive convolution of the film roll 33. See FIG. 13. The annular lips 49 and 51 overlap the film leader (outermost convolution) 35 of the film roll 33 radially outwardly of the longitudinal edges 53 and 55 of the leader to radially confine the leader to thus prevent it from radially expanding or clock-springing into substantial contact with an interior curved wall 58 of the cassette shell 3. A lip-receiving notch 59 is cut in the film leader (outermost convolution) 35 along its longitudinal edge 55, relatively close to its leading end 37, to receive a peripheral section 51' of the annular lip 51. This allows a relatively short edge-section 61 of the film leader (outermost convolution) 35 connecting the leading end 37 and the notch 59 to overlap the annular lip 51 radially outwardly to thus maintain the leading end spaced a radial distance D from the next-inward convolution 39 of the film roll 33. See FIGS. 4 and 9. The leading end 37 has a forward edge 63 inclined from the longitudinal edge 53 of the film leader (outermost convolution) 35 to the other longitudinal edge 55 of the leader to form a foward-most tip or tab 65 of the leader which, like the edge section 61, overlaps the annular lip 51 radially outwardly. See FIGS. 1, 2, 8 and 9.

The two flanges 41 and 43 have a plurality of concentric arcuate slots 66 cut in their respective disks 45 and 47 to longitudinally extend in the film unwinding and film winding directions U and W. Engagement means in the form of respective hook-like members 67, located on the short and longer open-end pieces 19 and 21 of the spool core 23, are normally located in the concentric slots 66 for movement along the slots into engagement with the flanges 41 and 43 responsive to rotation of the spool core relative to the flanges in the unwinding direction U and for movement along the slots out of engagement with the flanges responsive to rotation of the spool core relative to the flanges in the winding direction W. See FIGS. 12 and 13. Preferably, each of the hook-like members 67 has an end face 67' that is beveled to ease the hook-like member out of one of the concentric slots 66 responsive to rotation of the spool core 23 relative to the flanges 41 and 43 in the winding direction W, in the possible event the spool core is rotated relative to the flanges far enough in the winding direction to back the hook-like member out of the slot.

Figure 4:
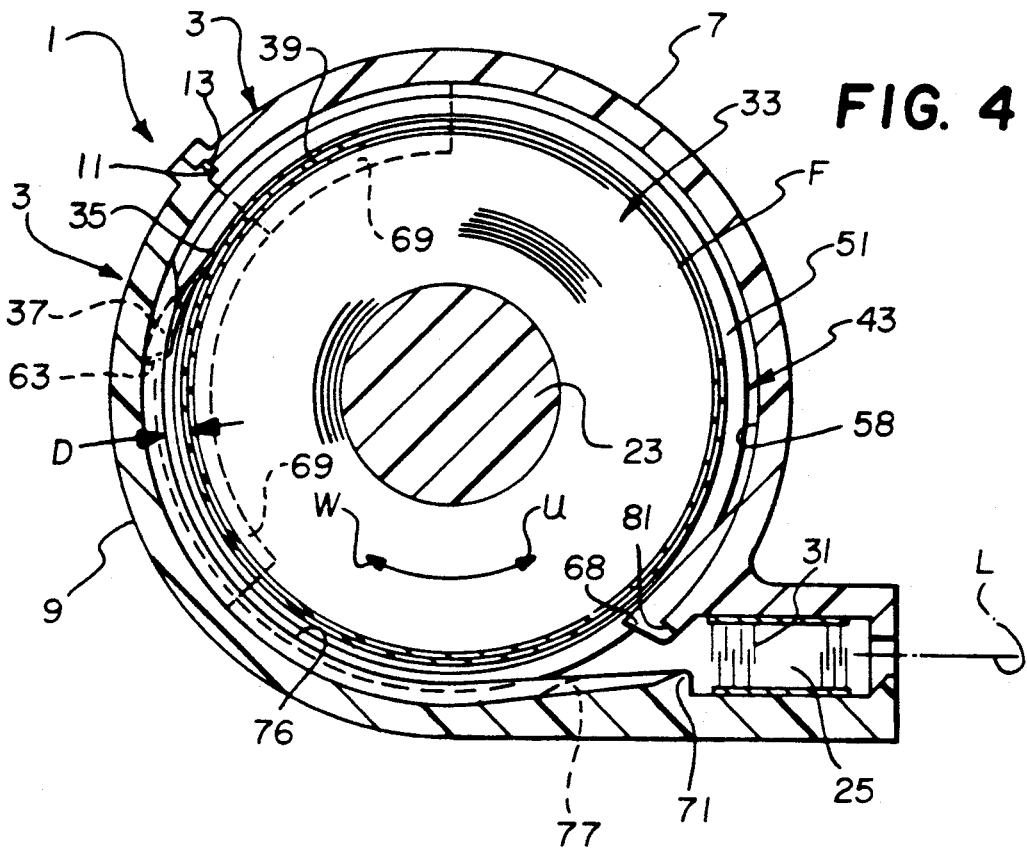
FIG. 4 is an end view partly in section of the cassette shell, the film roll and the film spool of said preferred embodiment, illustrating the manner in which the film roll is originally stored on the film spool.
Figure 5:
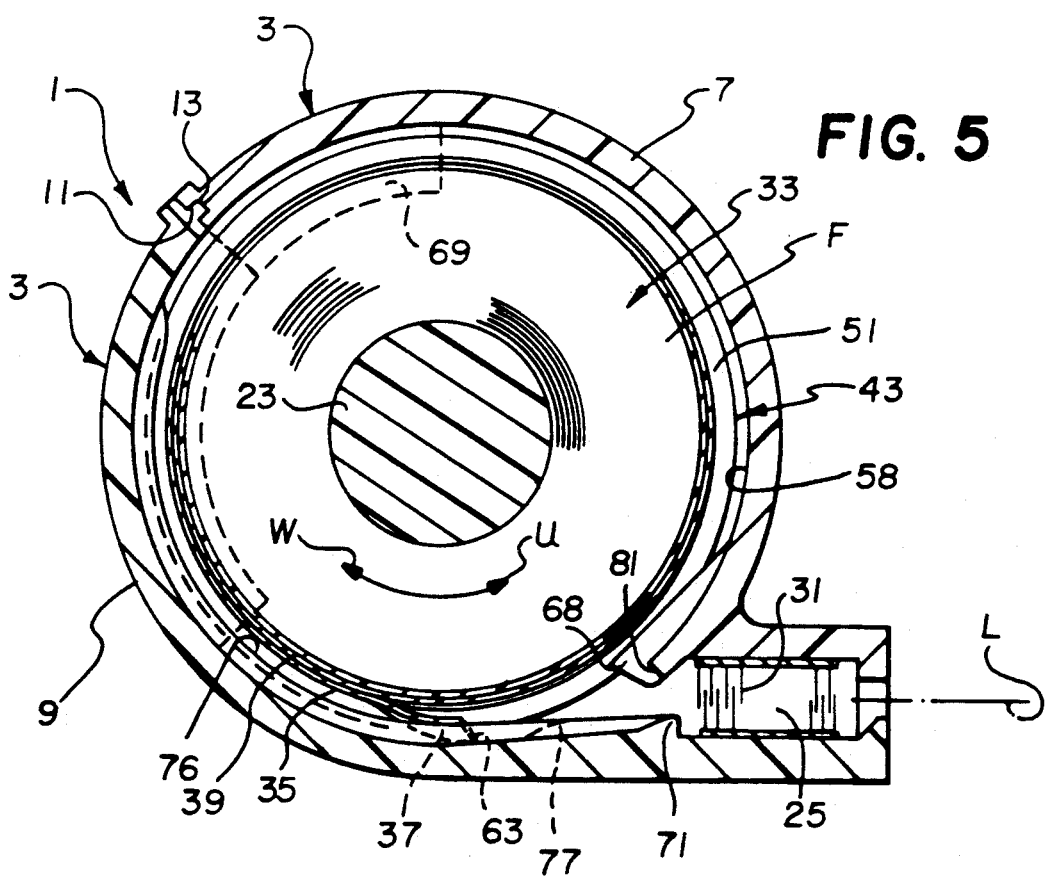
FIGS. 5, 6, and 7 are end views similar to FIG. 4, illustrating the manner in which the film roll is unwound from the film spool.

A film stripper-guide 68 projecting from the interior wall 58 of the cassette half 7 is positioned immediately inward of the inner entrance to the film passageway 25 to be received between the leading end 37 of the film leader (outermost convolution) 35 and the next-inward convolution 39, close to the forward-most tip 65 of the leader, to pick up the leading end and guide it into the film passageway responsive to rotation of the spool core 23 in the unwinding direction U. See FIGS. 1 and 4–7. The leading end 37 will be advanced over the stripper-guide 68 and into the film passageway 25, rather than between the stripper-guide and the next-inward convolution 39, because it is spaced the radial distance D from the latter convolution. Thus, as shown in FIG. 4, the leading end 37 will be located within range of the stripper-guide 68 due to such spacing D from the next-inward convolution 39.

Figure 10:
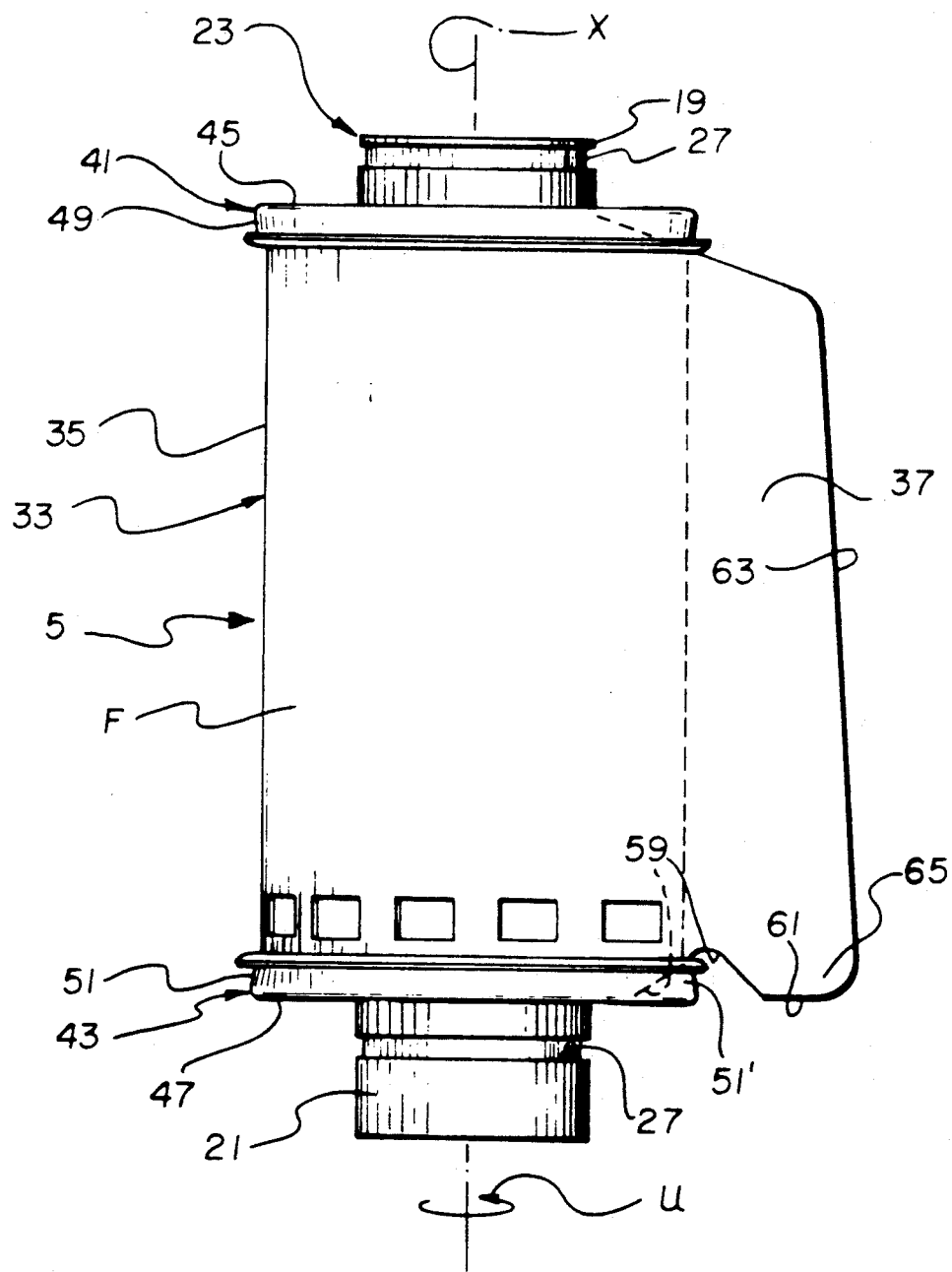
FIGS. 10 and 11 are elevation views similar to FIGS. 8 and 9, illustrating the manner in which the film roll is unwound from the film spool.

When the leading end 37 of the film leader (outermost convolution) 35 is advanced over the stripper-guide 68 responsive to rotation of the spool core 23 in the unwinding direction U, the longitudinal edges 53 and 55 of the leader start to gently flex respective arcuate portions of the two flanges 41 and 43 away from one another, i.e. farther apart, first to allow the notch 59 to separate from the lip section 51', and then to allow successive longitudinal sections of the leader to uncoil from between the flanges and exit to the outside of the cassette shell 3. See FIGS. 10 and 11. The flexing of the flanges 41 and 43 occurs because the film width WF between the longitudinal film edges 53 and 55 is slightly greater than the axial spacing $A_S$ between the annular lips 49 and 51. Moreover, successive convolutions of the film roll 33 have a resistance to transverse bowing that is greater than the resistance of the flanges 41 and 43 to be flexed. Two pairs of flat curved bearing members 69 project form the interior walls 58 of the respective shall halves 7 and 9 to lie flatly against successive arcuate portions of the two disks 45 and 47 as the flanges 41 and 43 are flexed away from one another, to only allow those flange portions separated from the bearing members to be flexed farther apart. See FIGS. 1, 2, and 4. The bearing members 69 are positioned relatively remote from the film passageway 25. Thus, the leader 35 is only allowed to uncoil from between the flanges 41 and 43 relatively close to the passageway 25. See FIG. 7.

A film flattening rib 71 projects from the interior wall 58 of the cassette half 9 in the vicinity of the inner entrance to the film passageway 25 and the stripper-guide 68 to support successive longitudinal sections of the film leader 35, beginning with its leading end 37, substantially flat widthwise as those sections are freed from the flanges 41 and 43, to facilitate movement of the leading end into the passageway. See FIG. 7. The light-trapping plush 31 within the film passageway 25 is elevated along the passageway slightly beyond a longitudinal center line L of the passageway. The film flattening rib 71 as shown in FIG. 4 projects almost to the center line L in order to support successive sections of the film leader 35 substantially flat at the center line. Preferably, the film-supporting tip or longitudinal edge of the flattening rib 71 is spaced 0.005" to 0.030" short of the center line L.

Two substantially parallel curved film supporting ribs 75 and 76 project from the interior wall 58 of the cassette half 7 to longitudinally extend from the film flattening rib 71 to part-way between the pair of bearing members 69 which project from the same wall. See FIGS. 1, 3 and 4. The film supporting ribs 75 and 76 longitudinally extend the entire location at which the film leader (outermost convolution) 35 can escape the confinement of the flanges 41 and 43, when the leader axially flexes the flanges away from one another. The film supporting ribs 75 and 76 as shown in FIG. 3 are positioned to be slightly spaced from the film leader 35, when the leader is confined within the annular lips 49 and 51. Another film supporting rib 77 projects from the interior wall 58 of the cassette half 7, opposite the stripper-guide 68. The other rib 77 is substantially parallel to and shorter than the first-two ribs 75 and 76. All three of the ribs 75–77 longitudinally extend perpendicular to and adjoin the flattening rib 71. See FIG. 1.

OPERATION

Figure 6:
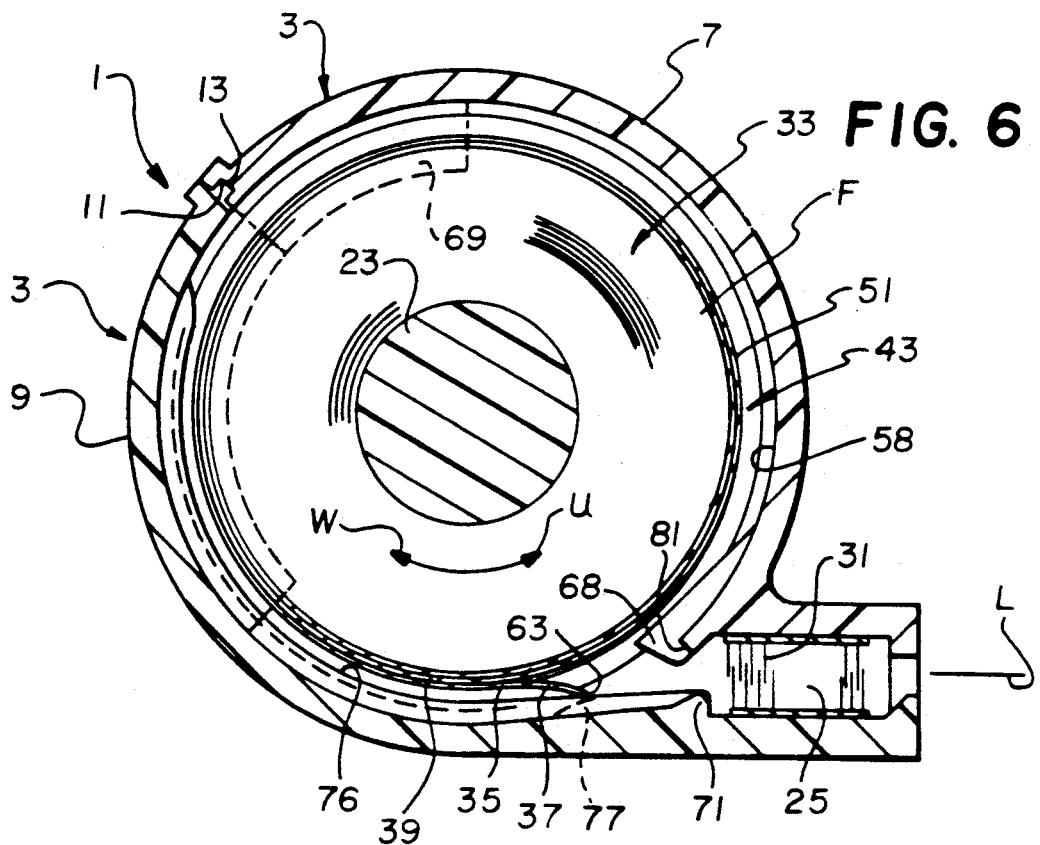
Figure 7:
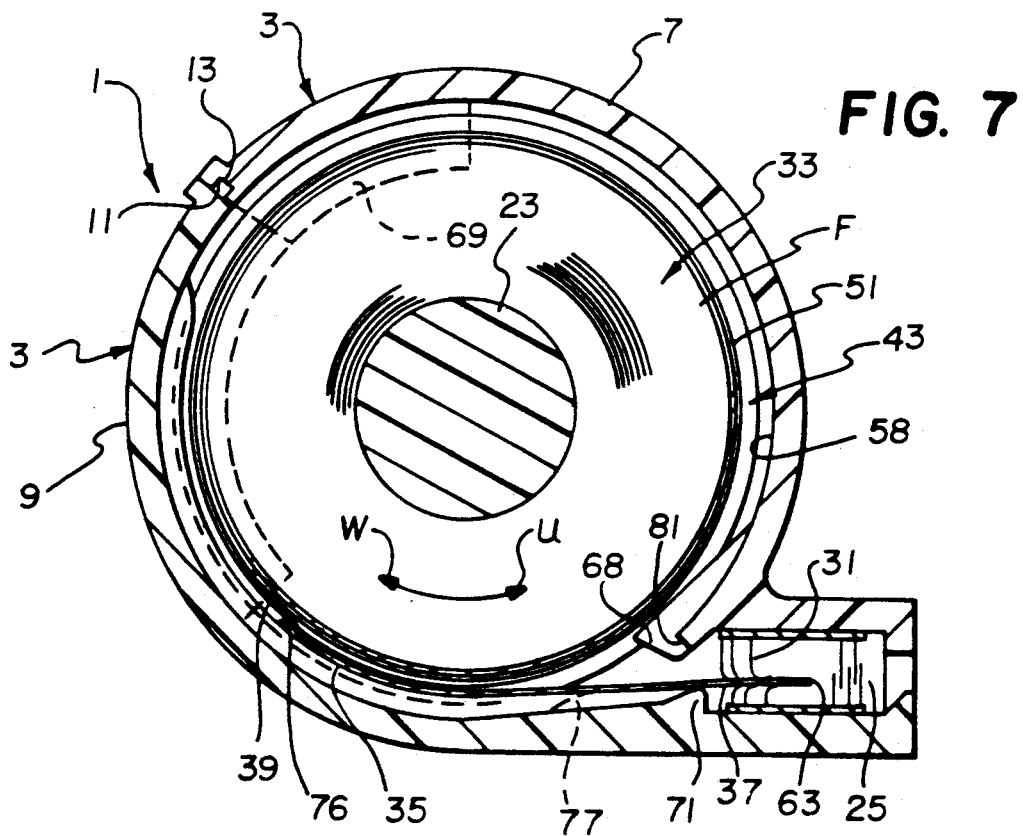
Figure 11:
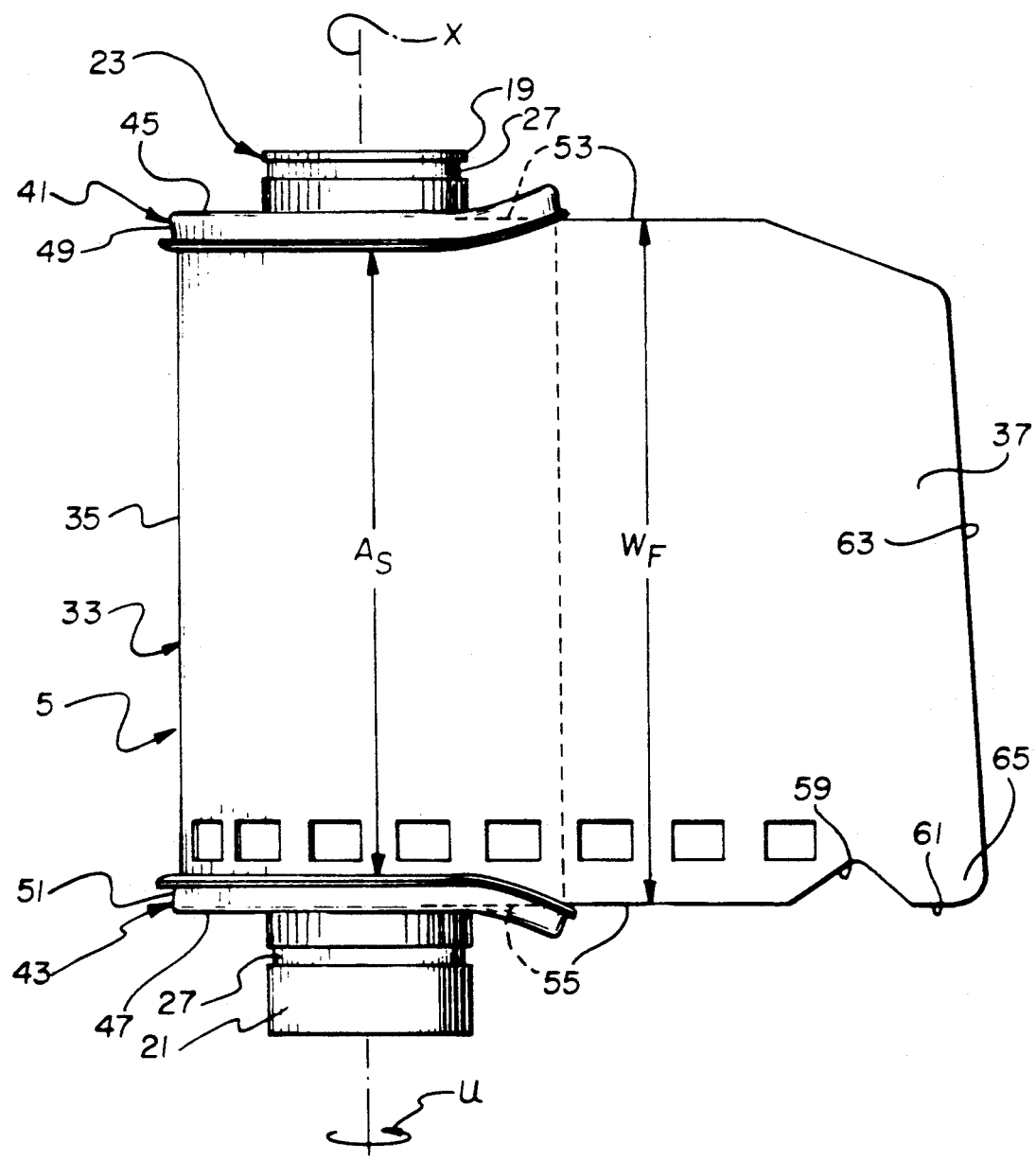
Figure 12:
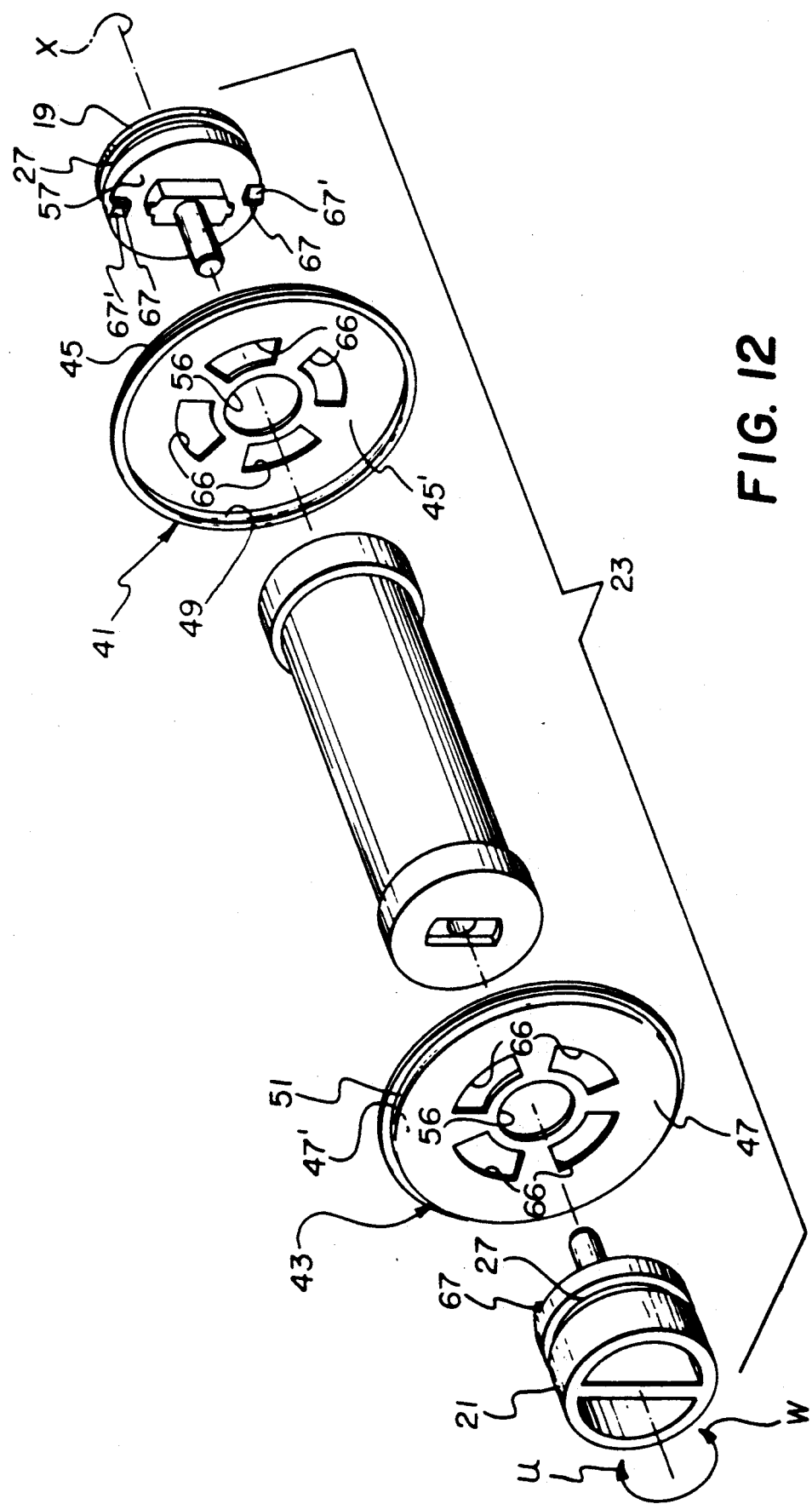
FIG. 12 is an exploded perspective view of the film spool without the film roll.

When the spool core 23 is initially rotated in the film unwinding direction U, the two flanges 41 and 43 momentarily tend to remain stationary and the film roll 33, since its inner end is attached to the spool core, will expand radially or clock-spring to force the film leader (outermost convolution) 35 firmly against the annular lips 49 and 51 of the flanges. Generally however, before the film roll 33 can be expanded radially to the extent a non-slipping relation would be created between the film leader (outermost convolution) 35 and the annular lips 49 and 51 as in commonly assigned U.S. Pats. No. 4,834,306, and No. 4,848,693, the hook-like members 67 will have moved along the respective slots 66 into engagement with the two flanges 41 and 43 to fix the flanges to the spool core. Then, further rotation of the spool core 23 will similarly rotate the flanges 41 and 43. As a result, the leading end 37 of the film leader (outermost convolution) 35 will be advanced over the shorter rib 77 and the stripper-guide 68, causing successive arcuate portions of the flanges 41 and 43 to be flexed away from one another as shown in FIG. 11. This first allows the notch 59 to separate from the lip section 51', and then it allows successive longitudinal sections of the film leader 35 to exit from between the flanges to the outside of the cassette shell 13. Since the stripper-guide 68 initially picks up the leading end 37 of the film leader 35 close to its forward-most tip 65, the forward edge 63 of the leading end will move against the film flattening rib 71 as shown in FIG. 6.

When the film leader 35 is thrust through the film passageway 25 to the outside of the cassette shell 3, the passageway due to the plush material 31 and subsequent receiving equipment such as a camera present resistance to outward movement of the leader. This resistance causes the leader 35 to further flex the flanges 41 and 43 away from one another to, in turn, allow more of the leader to uncoil from between the flanges. If the two ribs 75 and 76 were omitted from the shell half 9, the leader 35 would uncoil against the interior wall 58 of the shell half. As a result, increased torque would be required to rotate the spool core 23 in the film unwinding direction U. However, the two ribs 75 and 76 serve to severely limit the extent to which the leader 35 can uncoil from between the flanges 41 and 43.

If the spool core 23 is rotated in the film winding direction W after some length of the filmstrip F has been advanced from the cassette shell 3, the spool core is free to rotate relative to the two flanges 41 and 43 because the hook-like members 67 can move along the respective slots 66 out of engagement with the flanges. This permits the flanges 41 and 43 to be independently rotated in the winding direction W, though at a slower speed than the spool care 23 is rotated in that direction. Each of the hook-like members 67 may back out of one of the slots 66 and into the next slot during continued rotation of the spool core 23 in the winding direction W. At the same time, the filmstrip F will be rewound onto the spool core 23 between the flanges 41 and 43. The spool core 23 is rotated in the winding direction W substantially until the slot 75 in the film leader 35 receives the free end 79 of the tooth 77 to thus engage the film leader to the tooth.

It has been found that by fixing at least one of the two flanges 41 and 43 to the spool core 23 during unwinding rotation of the film spool 5, as contrasted with allowing the flange to remain rotatable independently of the spool core as in commonly assigned U.S. Pats. No. 4,834,306 and No. 4,848,693, there is immediately effected a frictional relationship between the film leader 35 and the skirted periphery of the flange which improves the ability of the film spool to thrust the film leader through the light-tight passageway 25 to the exterior of the cassette shell 3. In particular, the frictional relationship increases the pushing force the spool core 23 will apply to the film leader 35 to propel the leader out of the cassette shell 3. Moreover, it has been found that by allowing both of the flanges 41 and 43 to be rotated independently of the spool core 23 during winding rotation of the film spool 5, as in commonly assigned U.S. Pats. No. 4,834,306 and No. 4,848,693, it is substantially ensured that the leader can be rewound within the skirted peripheries 49 and 51 of the flanges without being obstructed by the skirted peripheries.

In accordance with the present invention, improved results are obtained with a thrust type film cassette, such as the type described above, wherein the skirted peripheries 49 and 51 of flanges 41 and 42 grip the outer convolution of the film roll and wherein at least one of the flanges rotates with the spool core 23 when the latter is rotated in the unwinding direction and assists in thrusting the film through the film passageway 25. The improved results are obtained through the combination in a cassette assembly of a thrust type cassette with a photographic film having certain properties.

Of these properties the most important is the coefficient of friction between the emulsion side and the back side of the film. In the cassette assembly of the invention the static coefficient of friction, measured with an inclined plane tester as described hereinafter, is less than about 0.25.

The tester consists of a pivoted platform, the free end of which can be elevated at a constant angular rate, and a "sled." The latter is a metallic block having a flat smooth surface and weighing 454 g. The tester is placed in a chamber or room having the environmental conditions at which the coefficent of friction is to be measured, which are normally 21° C. (70° F.) and 50 percent relative humidity (RH). The tester is leveled and the rate of platform rise set at 1 degree per second. Film samples to be tested are hung and separated so as not to touch each other and conditioned for at least two hours at the temperature and humidity at which the tests are to be done. One sample of film is attached to the platform on the tester by means of a clip. At this time the platform is in the horizontal position. Another sample of film is attached to the sled with double-sided adhesive tape. The film samples are arranged such that the emulsion of one sample faces the back of the other sample when the sled is placed on the platform.

When the film samples have been mounted as described, the sled (with mounted film sample) is gently placed in contact with the film sample on the platform so that the area of the sled is completely in contact with film on the platform. A switch is closed so that one end of the platform is allowed to rise at the rate cited above. Platform rise is stopped immediately when the first movement of the sled is noted. The static coefficient of friction is read directly from a scale corresponding to the angle of the platform (with the horizontal) when it was stopped. Otherwise, the coefficient of friction may be calculated from the following equation.

COF = tangent of platform angle

Several different types of 35 mm photographic roll films have been tested as described to determine the static coefficient of friction between the emulsion side and the back side of each film. For these tests the contact area between the two film samples was 25 mm (1 in) by 57 mm (2.25 in) and the sled weight was 454 g (1 lb). The test results are as follows:

| Film | Inclined Plane Static Coefficient of Friction (21° C./50% RH) |
| --- | --- |
| A | 0.15 |
| B | 0.39 |
| C | 0.45 |
| D | 0.46 |
| E | 0.22 |
| F | 0.33 |

In the above table, Films E and F were of the same type except that Film E had a thin layer of carnauba wax on the back side while Film F did not.

The term "coefficient of friction" when used in this specification and the appended claims means the value measured by this test at 21° C. and 50% RH.

As an unexpected consequence of the low coefficient of friction, at least two important benefits are obtained. First, the force with which the outer convolution of the film contacts the skirted peripheries of the flanges increases. Therefore, the frictional grip of the film roll by the skirted peripheries increases and the force with which the rotating flange or flanges thrusts the film through the film passageway increases. Likewise, as a result of the improved grip on the outer convolution by the skirted periphery, the main force serving to unwind the film and thrust it through the passageway is the force exerted by the skirted peripheries rather than the pushing force imparted by the spool core to the innermost convolution of the film. This, therefore, reduces the reliance on the latter force which can cause buckling or crumpling of the innermost convolution of the film if the outer convolution meets excessive resistance to thrusting.

Although the applicants do not wish to be bound by a theoretical explanation of the frictional mechanism, it appears that the low coefficient of friction between the emulsion side and the back side of the film serves in at least two ways to increase the force with which the outer convolution of the film presses against the skirted peripheries. One is that the slipperiness of the convolutions in back-to-front contact with each other permits the usual clock spring force of the film roll to be transmitted efficiently to the outer convolution and hence to the skirted peripheries. The coefficient of friction between the emulsion and back sides of the film is so low that the radially-directed clock spring force of the film roll and/or the force applied to the innermost convolution by rotating the spool core is transmitted through the successive convolutions of the roll and against the skirted peripheries with so little frictional loss that, when the flanges rotate in an unwinding direction, they rotate the film roll and assist in thrusting the film through the film passageway.

Preferably, the film has sufficient stiffness because of its chemical composition and the physical conditions to which it has been subjected (temperature, tension, etc.) that the film roll exerts a substantial clock spring force against the skirted peripheries without rotation of the spool core. However, even though the film, for example, has been heat relaxed to such an extent that it exerts little or no clock spring force, the low coefficient of friction assists in providing adequate radially-directed force by the outer convolution of the film roll against the skirted peripheries to ensure good gripping of the film roll by the skirted peripheries. This is accomplished by rotating the spool core in the unwinding direction. When this is done with the slippery film as described herein, each rotation causes the film roll to expand radially as the consecutive convolutions slip against each other. By virtue of the low coefficient of friction, this radial expansion of the film roll is facilitated even when the film has little or no clock spring force.

A second unexpected benefit of the low coefficient of friction is that the ends of the film roll have essentially no protruding convolutions as the film unwinds. Any possible tendency of the film to unwind unevenly, so that one or more convolutions protrude from an end of the roll, is resisted by the pressure of the flanges against the ends of the roll. Since the flanges are flexible this pressure is not great. Nevertheless, it is great enough to prevent protrusions at the ends of the roll when the film is sufficiently slippery, i.e., when the coefficient of friction between the emulsion side and back side is less than about 0.25.

The desired low coefficient of friction between emulsion side and back side can be achieved by controlling the surface properties of either side or both. One useful way is to coat the back side of the film with a layer of a slippery substance, preferably a thin layer of such a substance. Various lubricating agents are suitable provided they do not harm the photographic or other properties of the film.

Representative lubricants which can be used on one or both surfaces of the photographic films include long-chain fatty acids, alkali salts of sulfonated castor oil, alkaline earth metal salts of higher aliphatic carboxylic acids, monohydric and dihydric alcohols, ethers, primary amides, hydroxyalkyl amine fatty acid condensates, esters, polyesters, sperm-oil products, polysaccharide derivatives, polytetrafluoroethylene particles, colloidal silica, silicone derivatives, polymeric silicone compounds plus $\beta$-alanine-derivative surfactants, mixtures of an alkyl silicone and an aryl silicone, phosphate triesters, alkali metal salts of alkylphosphoric acid esters, poly(methyl methacrylate) beads, betaines, acyl alkyl taurines and paraffins and waxes such as castor wax and carnauba wax, as illustrated by Guestaux et al. U.S. Pat. No. 3,658,573, Robijns U.S. Pat. No. 2,588,765, Nellist et al. U.K. Pat. No. 1,263,722, Brown et al. U.K. Pat. No. 1,320,564 and 1,320,757, Duane U.S. Pat. No. 3,121,060, Research Disclosure, Vol. 139, Nov., 1975, Item 13969, Mackey et al. U.S. Pat. No. 3,870,521, Stephens U.S. Pat. No. 3,679,411, McGraw U.S. Pat. No. 3,489,567, Ben-Ezra U.S. Pat. No. 3,042,522, U.K. Pat. No. 955,061, Tallet et al. U.S. Pat. No. 3,080,317, Earhart et al. U.S. Pat. No. 3,516,832, Secrist et al. U.S. Pat. No. 3,295,979, and Guestaux French Patent 2,180,465, Shibue et al. U.K. Patent Application 2,027,221, Naoi et al. U.S. Pat. No. 4,232,117 and Sugimoto et al. U.S. Pat. No. 4,675,278, all of which are incorporated herein by reference.

Preferred lubricants include carnauba wax, silicone polymers such as disclosed in U.S. Pat. No. 4,866,469, incorporated herein by reference, and fluorocarbon polymers. It is also possible to blend the film support polymer with a lubricant material which will migrate to the surface after the film is cast or extruded. See, for example, U.S. Pat. No. 4,784,928 which discloses a polymer containing a dispersion of particles of "abhesive" substances such as fluorocarbon polymers, calcium stearate or polyolefin wax, said patent being incorporated herein by references. Still another way to achieve the desired lubricity is to use a film support which is made from a polymer that has high lubricity. Examples of such polymers include block copolyesters which have crystalline or silicone or fluorocarbon segments or grafts that confer lubricity. Useful film forming polymers of this kind are disclosed, for example, in U.S. Pat. No. 4,847,175, incorporated herein by reference.

Although the desired low coefficient of friction can be obtained by providing a slippery surface for the back side of the film, usually the surface of the emulsion side of the film must also be adjusted. This is because the surface properties of an aqueous emulsion layer, even when covered by a conventional hardened gelatin overcoat, will vary according to ambient temperature and humidity. An emulsion overcoat which might have satisfactory surface properties in cold, dry weather can become unsatisfactory in warm, humid weather. Accordingly, it is desirable to select an overcoat for the emulsion side which, with respect to the particular lubricity of the back side of the film, will provide a low coefficient of friction, i.e., below about 0.25. A preferred emulsion overcoat of this kind is a matte overcoat of the type which is used to prevent ferrotyping and blocking of photographic roll films. Examples of such overcoats which contain matting agents are disclosed in U.S. Pat. Nos. 2,322,037; 2,376,005; 2,701,245; 2,992,101; 3,807,521; and 4,029,504. Especially preferred is a matte overcoat which comprises microbeads of of a crosslinked polymeric resin dispersed uniformly with a lubricant in a hardened gelatin layer. Such layers preferably range in thickness from about 0.5 to 6 μm although thinner or thicker layers can be used. Preferably, the microbeads are composed of polystyrene which is crosslinked with divinyl benzene, the beads being made by "limited coalescense" polymerization as disclosed in U.S. Pat. No. 3,615,972, incorporated herein by reference.

In an especially preferred film for use in the cassette assembly of the invention, the surface of the backside is a thin layer (e.g., 0.01 to 0.2 μm) of carnauba wax and the surface of the aqueous emulsion side is a matte layer.

All of such means for achieving a low coefficient of friction between the front and back sides of the film as contemplated herein, including coating with a lubricant or a matte layer or employing a film support that has high lubricity, are integral means for providing a low coefficient of friction.

Additional advantages are obtained when the photographic film in the cassette assembly of the invention not only has the mentioned low coefficient of friction between its emulsion and back sides but also has a stiffness which is sufficient to avoid buckling of the film as the cassette spool is turned in the unwinding direction. Applicants have discovered in accordance with the invention that further improved functioning of the thrust film cassette is achieved when the film has sufficient stiffness to avoid such buckling.

The stiffness of a plastic article is often defined quantitatively as the product of (a) the Modulus of Elasticity in Flexure and (b) three times the Moment of Inertia of the cross-section of the sample. For thin plastic films, however, such as films having a thickness less than about 0.15 mm, the Modulus of Elasticity in Flexure is difficult to measure. Therefore, for defining the stiffness of the films in the cassette assembly of the present invention, "stiffness" is calculated from the Tensile Modulus of Elasticity, the latter being measured in accordance with ASTM D882-88, "Standard Test Method for Tensile Properties of Thin Plastic Sheeting."

The definition of the stiffness of films as used herein, therefore, is:

$$\text{Stiffness} = E^* 3wt^3/12 = \frac{E^* wt^3}{4}$$

wherein:
E = Tensile Modulus of Elasticity (N/mm$^2$)
w TM Width of film sample (mm)
t = thickness of film sample (mm)

To illustrate the values for stiffness, as defined above, the stiffness of three types of 35 mm photographic film bases is as follows:

| | Elastic Modulus (N/mm$^2$) | Thickness (mm) | Stiffness (N-mm$^2$) |
|---|---|---|---|
| Poly(ethylene terephthalate) | 4825 | 0.05 | 5.28 |
| Cellulose Triacetate | 3800 | 0.075 | 14.03 |
| Cellulose Triacetate | 3800 | 0.113 | 47.3 |

Preferably the stiffness of the film in the cassette assembly of the invention is at least about 5 N-mm$^2$ and, most preferably, at least about 10 N-mm$^2$. This high stiffness contributes to the improved results in more than one way. It provides a reasonably high clock spring force which is transmitted by the consecutive coils or convolutions of the slippery film to the outer convolution which is gripped by the skirted peripheries of the flanges or other film thrusting means. The relatively large resulting pressure on the thrusting means will cause the film roll to rotate as the spool rotates and thrust the leading end of the film through the film passageway.

The stiffness of the film support also aids in ensuring that the film does not buckle or crumple either at the spool core end or at the entrance to the film passageway when the film is thrust through it.

An important advantage of the cassette assembly which includes a film of high lubricity and high stiffness is that the film support can be thin, e.g., less than 0.1 mm. Such a thin film is highly desirable because the film roll can be of small diameter, the cassette can be small and, hence, the camera can be small. All of these are highly desirable but heretofore difficult to achieve with a thrust-type cartridge and conventional film. The combination of stiffness with the low coefficient of friction between the emulsion side and the back side, contributes to the efficient functioning of the thrust cartridge with a thin film and protects against buckling or crumpling of the thin film near its attachment point to the spool.

Useful results in accordance with the invention can be achieved with a variety of known types of photographic film supports provided that the film surfaces are appropriately treated to give the required coefficient of friction.

Typical of useful polymeric film supports are films of cellulose nitrate and cellulose esters such as cellulose triacetate and diacetate, polystyrene, polyamides, homo- and copolymers of vinyl chloride, poly(vinyl acetal), polycarbonate, homo- and copolymers of olefins such as polyethylene and polypropylene, and polyesters of dibasic aromatic carboxylic acids with divalent alcohols such as poly(ethylene terephthalate).

Preferred cellulose ester supports are cellulose triacetate supports as illustrated by Fordyce et al. U.S. Pat. Nos. 2,492, 977, '978 and 2,739,069, as well as mixed cellulose ester supports such as cellulose acetate propionate and cellulose acetate butyrate as illustrated by Fordyce et al. U.S. Pat. No. 2,739,070.

Preferred polyester film supports are comprised of linear polyester such as illustrated by Alles et al. U.S. Pat. No. 2,627,088, Wellman U.S. Pat. No. 2,720,503, Alles U.S. Pat. No. 2,779,684 and Kibler et al. U.S. Pat. No. 2,901,466. Polyester films can be modified for use as photographic film supports by subbing, etc., as illustrated by VanStappen U.S. Pat. No. 3,227,576, Nadeau et al. U.S. Pat. Nos. 3,143,421 and 3,501,301, Reedy et al. U.S. Pat. No. 3,589,905, Babbitt et al. U.S. Pat. No. 3,850,640, Bailey et al. U.S. Pat. No. 3,888,678, Hunder U.S. Pat. No. 3,904,420, Mallinson et al. U.S. Pat. No. 3,928,697, Van Paesschen et al. U.S. Pat. No. 4,132,552, Schrader et al. U.S. Pat. No. 4,141,735, McGrail et al. U.S. Pat. No. 4,304,851, Kreil et al. U.S. Pat. No. 4,594,262, and Bayless et al. U.S. Pat. No. 4,645,731.

The photographic films can employ supports which are resistant to dimensional change at elevated temperatures. Such supports can be comprised of linear condensation polymers which have glass transition temperatures above about 190° C., preferably 220° C., such as polycarbonates, polycarboxylic esters, polyamides, polysufonamides, polyethers, polyimides, polysulfonates and copolymer variants, as illustrated by Hamb U.S. Pat. Nos. 3,634,089 and 3,772,405; Hamb et al. U.S. Pat. Nos. 3,725,070 and 3,793,249.

A preferred embodiment of the present invention employs as the film base a modified polyester which has sufficient tensile strength to be used in a thin format and which, unlike conventional poly(ethylene terephthalate), will relax its core set or curl when processed in aqueous baths. The preferred modified polyester film is a hydrophilic copolyester of an aromatic dicarboxylic acid, an aromatic dicarboxylic acid having a sulfonic acid salt substituent on its aromatic nucleus, ethylene glycol and a poly(ethylene glycol) of low molecular weight. A preferred embodiment is made by the reaction of four monomers, namely, dimethyl terephthalate, dimethyl 5-sodiosulfo isophthalate, ethylene glycol and poly(ethylene glycol) having a number average molecular weight in the range from about 300 to 1600.

The synthesis, composition and properties of copolyesters of this kind for use as the film supports in the cassette assembly of the present invention are disclosed in copending and commonly owned U.S. Pat. application Ser. No. 645,945 of Brozek et al. entitled "Modified Polyester Useful as Photographic Roll Film Support" filed Jan. 25, 1991, the entire disclosure of which is incorporated herein by reference. Films of this kind having an elastic modulus of at least about 3.3 and preferably at least about 3.45 GPa and a thickness less than 0.1 mm are preferred film supports in accordance with the present invention. A film support thickness as low as about 0.05 mm is suitable with films having sufficient stiffness, e.g., greater than 10 N-mm$^2$ and a coefficient of friction between the emulsion side and back side less than about 0.25. Therefore, in preferred embodiments of the present invention wherein the film is thin and the cassette is small, the film support thickness is in the range from about 0.05 to 0.1 mm.

The photographic films in the cassette assembly of the invention can have photographic silver halide emulsion layers and other layers such as intermediate layers, barrier layers, scavenger layers, filter layers, antihalation layers, overcoat layers, magnetic layers and subbing layers, in any order known to be useful in the photographic art. Useful magnetic layers are disclosed, for example, in the patent to Krall, U.S. Pat. No. 3,782,947 and Audran, U.S. Pat. No. 4,279,945.

The photographic films can contain conducting layers such as antistatic layers. Such layers can contain soluble salts such as chloride, nitrate and similar water soluble salts; conductive metals such as evaporated metals; conductive carbon as illustrated by Simmons U.S. Pat. No. 2,327,828; insoluble inorganic salts such as those described by Trevoy U.S. Pat. Nos. 3,245,833 and 3,428,451; and polymers having ionic groups as illustrated by Minsk U.S. Pat. Nos. 2,861,056, Sterman et al. U.S. Pat. No. 3,206,312, Babbitt et al. U.S. Pat. No. 3,775,126, and Trevoy U.S. Pat. Nos. 3,963,498, 4,025,342, 4,025,463, 4,025,691 and 4,025,704; combinations of inorganic salts and compounds comprising polyalkylene oxides as illustrated by Kishimoto U.S. Pat. No. 4,272,616, and Chen et al. U.S. Pat. Nos. 4,582,781 and 4,610,955.

The invention has been described with reference to a preferred embodiment. However, it will be appreciated that variations and modifications can be effected within the ordinary skill in the art without departing from the scope of the invention.

We claim:

1. A film cassette assembly comprising a thrust-type film cassette and a roll of photographic film wherein
    (a) said cassette includes a film thrusting means and a cassette shell; (b) said thrusting means includes a spool core supported for rotation in an unwinding direction within the cassette shell, (c) a film roll, the outermost convolution of which is a film leader, is coiled about said spool core, and (d) upon rotation of the spool core in an unwinding direction, said film thrusting means thrusts the film leader through a passageway to the exterior of said cassette shell,
    and further, wherein said film is characterized in that said film has a Photographic emulsion side and a back side and at least one of said emulsion side and said back side include integral means for providing a coefficient of friction between the emulsion side and the back side that is less than about 0.25, which is sufficiently low that, when the spool core is rotated in an unwinding direction, an unwinding force is transmitted along all of the convolutions of the film roll from the innermost convolutions to the outermost convolutions to assist the thrusting means in thrusting the film through the passageway.

2. A film cassette assembly comprising a thrust-type film cassette and a roll of photographic film wherein (a) a spool core is supported for rotation in an unwinding direction within the cassette shell, (b) a film roll whose outermost convolution is a film leader is coiled about said spool core, (c) a pair of flexible flanges are coaxially arranged along said spool core abutting the ends of said film roll to confine the ends of said film roll coiled about the spool core within respective skirted peripheries of said flanges to prevent said film leader from uncoiling against an interior, curved wall of said cassette shell, and (d) a film stripper proximate to a passageway to the exterior of said cassette shell is received between said film leader and the next-inward convolution of said film roll responsive to rotation of said spool core in the unwinding direction to remove the leader from the confinement of said skirted peripheries to permit it to enter said passageway, and wherein said flanges are sufficiently flexible to allow said film leader to force the flanges farther apart to escape the confinement of said skirted peripheries, when said spool core is rotated in the unwinding direction with said stripper received between the leader and the next-inward convolution of said film roll; characterized in that
    at least one of said flanges is so mounted on said spool core as to rotate with the spool core when the latter is rotated in the unwinding direction,
    said film has a photographic emulsion side and a back side and the coefficient of friction between the emulsion side and the back side is less than about 0.25,
    said coefficient of friction is sufficiently low that, when the ends of said film roll are between said abutting flanges, said ends of the roll have essentially no protruding convolutions, and the radially-directed force resulting from clock springing or from unwinding of the film roll is transmitted through the convolutions of the roll and against the skirted peripheries of the flanges with so little frictional loss that, when the flanges rotate in an unwinding direction, they rotate the film roll and assist in thrusting the film through the passageway and subsequent receiving equipment.

3. An assembly according to claim 2 wherein said film comprises a film support and one or more light-sensitive photographic emulsion layers and wherein said film support has a stiffness of at least about 5 N-mm².

4. An assembly according to claim 3 wherein the film support has a stiffness of at least about 10 N-mm².

5. An assembly according to claim 4 wherein the thickness of said film support is from about 0.05 to 0.1 mm.

6. An assembly according to claim 1 wherein said film has an aqueous emulsion side and a back side, the surface of said back side being a thin layer of carnauba wax and the surface of said emulsion side being a matte layer.

7. An assembly according to claim 5 wherein said support is a film-forming polyester.

8. An assembly according to claim 6 wherein said film support is formed from a film-forming copolyester of an aromatic dicarboxylic acid, a low molecular weight poly(ethylene glycol), ethylene glycol and an aromatic dicarboxylic acid having a sulfonic acid salt substituent on its aromatic ring.

* * * * *